July 30, 1968   F. C. CATTERFELD   3,394,919
FLOATING HOT FLUID TURBINE NOZZLE RING
Filed Nov. 22, 1966
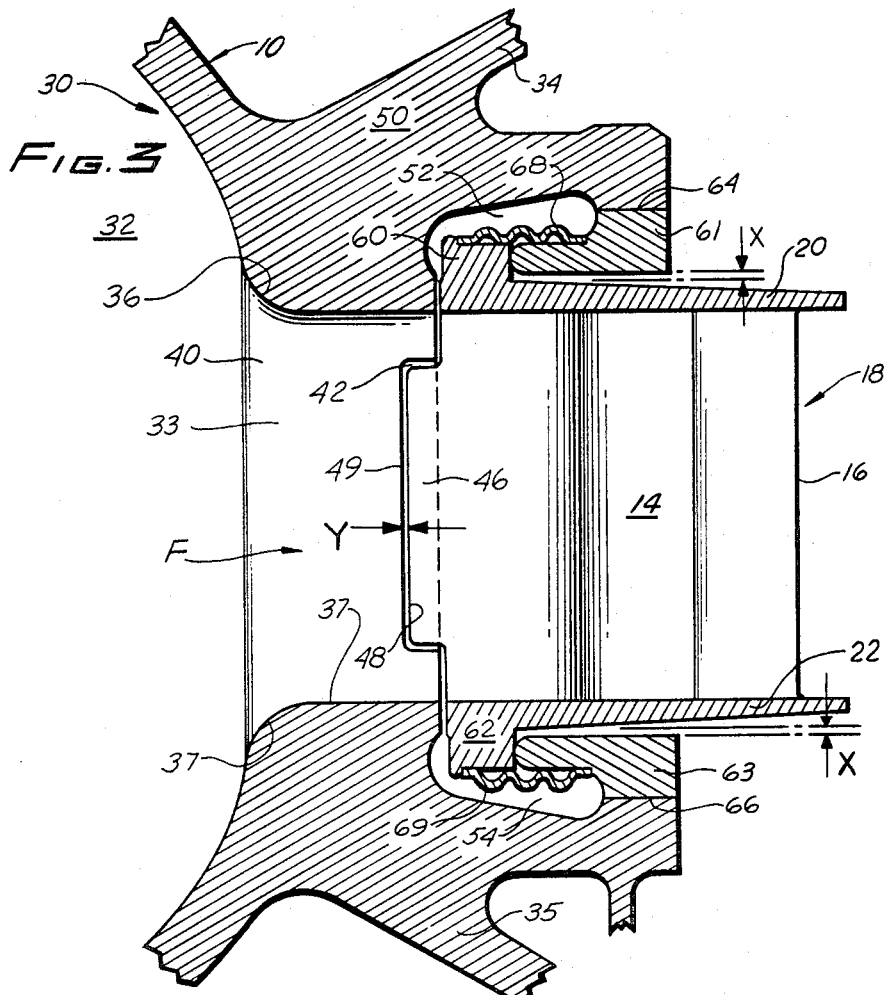
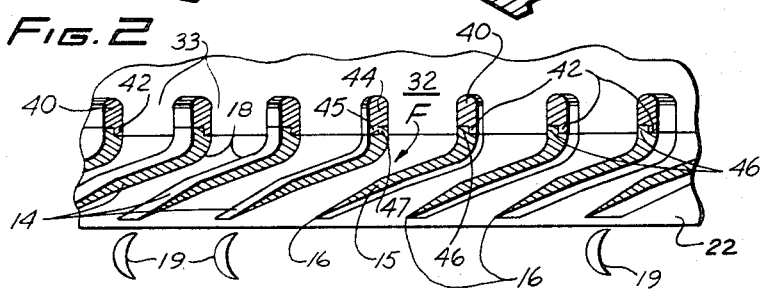
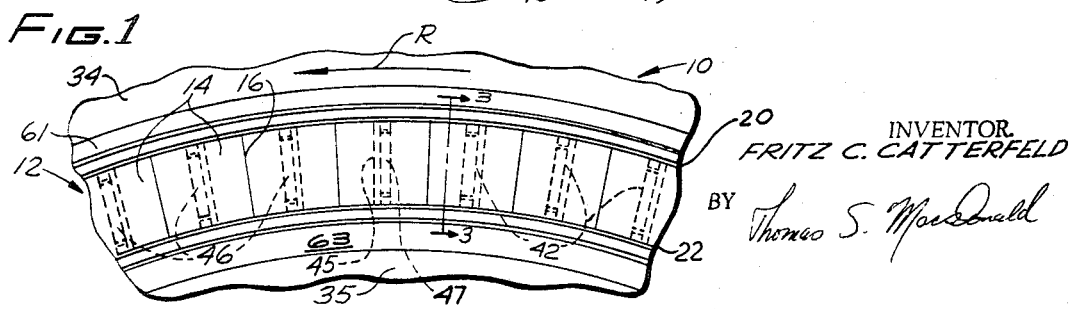
INVENTOR.
FRITZ C. CATTERFELD
BY Thomas S. MacDonald

United States Patent Office 3,394,919
Patented July 30, 1968

3,394,919
FLOATING HOT FLUID TURBINE NOZZLE RING
Fritz C. Catterfeld, Canoga Park, Calif., assignor to North American Rockwell Corporation, a corporation of Delaware
Filed Nov. 22, 1966, Ser. No. 596,219
5 Claims. (Cl. 253—78)

ABSTRACT OF THE DISCLOSURE

The disclosure describes a nozzle ring for the stator component of a turbine. It is capable of free thermal expansion and has a series of tongues that interlock with mated tongues on the stator so that relative rotation is prevented.

---

The invention described herein was made in the performance of work under a NASA contract and is subject to the provisions of Section 305 of the National Aeronautics and Space Act of 1958, Public Law 85-268 (72 Stat. 435; 42 USC 2457).

This invention relates to nozzles and more particularly to a nozzle ring through which hot fluids are driven to turbine wheels.

One type of conventional prior art turbine assembly has a stator component incorporating annularly aligned nozzles arranged in a nozzle ring. The individual nozzles are prone to rupture due to high stresses and strain engendered by extremely hot fluids and high pressures. The nozzle ring is generally integrally united with the hot fluid collecting manifold portion of the stator or is otherwise rigidly connected to the manifold with the adverse result that stresses and strains in the manifold are transmitted to the nozzle. The nozzle ring is required to absorb enormous forces transmitted from the manifold structure as well as the forces which are inherently developed in the nozzle ring itself. Heating and chill-down cycles produce fatigue in the nozzle ring and eventually cracks are developed which often are propagated to a point where individual nozzles split or explode.

These foregoing disadvantages inherent in nozzle rings presently being utilized are avoided by the instant invention. A nozzle ring is installed adjacent a hot fluid manifold portion of the stator component of a turbine assembly and is mounted in fixed relationship to the stator in a manner such that harmful forces cannot be transmitted from other sections of the stator to the nozzle ring. The nozzle ring is coupled to other parts of the stator so as to constitute a thermal expansion joint enabling the nozzle ring to freely float and deform in both radial and axial directions, while at all times remaining locked relative to the other stator components.

Briefly described, one embodiment formed in accordance with the instant invention is a turbine assembly whose stator component includes a hot fluid collecting manifold and a nozzle ring mounted adjacent an annular fluid outlet port formed in the manifold. Complementary interfitting locking tongues are formed on rib sections of the manifold and vane sections of the nozzle ring, the tongues serving to fix the relative position of the nozzle ring and manifold and restrain relative rotation. The coupling between the manifold and nozzle ring constitutes a thermal expansion joint so that stresses deforming the manifold cannot be transmitted to the nozzle ring. The ring is thermally unrestrained while being structurally confined. Thus, a durable, high-integrity nozzle ring is provided.

Accordingly, an object of this invention is to provide a hot fluid nozzle assembly that can freely deform to alleviate stresses tending to destroy it.

The above object, as well as additional objects of the instant invention will be fully understood by studying the following detailed description in conjunction with the detailed drawings in which:

FIG. 1 is a fragmentary elevational view of a portion of manifold and nozzle ring components of a stator associated with a turbine.

FIG. 2 is a perspective top view through a fragmentary section of the nozzle ring.

FIG. 3 is a side elevational fragmentary view of portions of the manifold and nozzle ring taken along line 3—3 of FIG. 1.

Turning now to a specific embodiment of the invention and more particularly to FIGS. 1 and 2, stator 10 is shown. Stator 10 is the stationary component of a turbine assembly (not fully shown). A nozzle ring 12 is installed in stator 10 in a manner which will subsequently be explained with reference to FIG. 3. Ring 12 is formed with an annular outer wall 20, and an annular inner wall 22 which are spaced from one another by a series of radially extending vanes 14. Ring 12 is a rigid unitary steel casting. Vanes 14 have forward edges 16 and define in conjunction with outer wall 20 and inner wall 22 a series of individual hot-fluid exit nozzles 18, most clearly shown in FIG. 2. Nozzles 18 are formed with constricted or throat zones so that the velocity of fluid flowing in the direction as indicated by arrow F can be increased. Fluid, such as hot gas or superheated steam, passing through nozzles 18 is deflected by contoured walls of vanes 14 and impinged upon the surfaces of buckets or blades 19. Blades 19 schematically depicit the rotor or rotating portion of the turbine. The rotation produced in the rotor by the hot gases striking buckets 19 can be used to achieve any of numerous conventional functions. For example, a shaft (not shown) may be attached to the rotor to regulate a pump. Arrow R show in FIG. 1, indicates that the rotation of buckets 19 is counterclockwise. While the cross-sectional geometry of the individual nozzles 18 is shown as rectangular, it should be noted that any other suitable cross-sectional geometry could be employed, such as circular, elliptical, polygonal shapes etc.

FIG. 3 shows a detailed enlargement of an individual nozzle 18. Stator portion 10 is formed with a torus-shaped manifold 30 defining a fluid collecting chamber 32 from which fluid is passed to nozzles 18 through a series of windows 33. Windows 33 are formed by a series of apertures in the outer wall of torus-shaped manifold 30 and are spaced for registering alignment with mated nozzles 18. Windows 33 are defined by a plurality of peripherally arranged radially extending ribs 40, an outer annular shoulder 36 and an inner annular shoulder 37. Shoulders 36 and 37 are spaced equdistantly from one another throughout their respective lengths and define an annular part for fluid discharge. Integrally formed with manifold 30 are support members 34 and 35 which can be struts, shrouds or other suitable rigid members that rigidly connect to base members (not shown) to anchor stator 10.

Extending outwardly from manifold 30 is an annular boss section 50 formed on its interior periphery with oppositely facing symmetrical recesses 52 and 54. Adjacent the inner or upstream end of ring 12 (shown in FIG. 1) is a pair of radially extending annular positioning lugs 60 and 62 inserted into recesses 52 and 54 respectively.

As previously mentioned, conventional hot fluid nozzle rings are generally either integrally formed with, or rigidly connected to a portion of the stator. As a result, extremely hot fluids and accompanying high pressures to which the ring is exposed cause tremendous concentrated stress build-ups which develop cracks. Repetitive temperature cycling will propagate the cracks until portions of the nozzle are sheared away or otherwise ruptured with the result that the flow becomes irregular and the expected results cannot be achieved. For example, disintegration of one or more nozzles would result in an unexpected impingement pattern of gases against the turbine blades such that rotation of the turbine wheel cannot be accurately predicted. The rupturing pressure is often reached because forces associated with manifold deformation are transmitted to the ring. The ring must then absorb these loads as well as its own loads or else the ring becomes destroyed. These disadvantages are eliminated according to the instant invention because of the free moving relationship of nozzle ring 12 relative to the other portions of stator 10.

Arranged in sliding relationship with positioning lugs 60 and 62 is a pair of retaining rings 61 and 63 respectively that have rounded convex inner ends. Retaining rings 61 and 63 are welded at zones 64 and 66 respectively to mating surfaces formed on boss 50. Alternatively, rings 61 and 63 could be bolted to boss 50. A pair of leaf spring hoops 68 and 69 are welded at their inner ends to lugs 60 and 62 respectively and are welded at their outer ends to retaining rings 61 and 63, respectively. While the major advantages could still be achieved if hoops 68 and 69 were removed, they serve to seal fluid from escaping from cavities 52 and 54. Due to hoop 68 retaining ring 61 and ring nozzle outer wall 20 are separated by a predetermined gap X. In a similar manner, retaining ring 63 is separated by a predetermined gap X from ring nozzle inner wall 22. Lugs 60 and 62, recesses 52 and 54, and hoops 68 and 69 constitute a thermal expansion joint. Under changing temperature conditions, the gap X will vary, although it is designed so that walls 20 and 22 never contact their adjacent retaining rings 61 and 63. Enormous stress and strain concentrations which otherwise would rupture nozzle 18 are virtually eliminated because ring 12 is permitted to freely thermally expand without bearing against portions of boss 50. As extremely hot gases flow through nozzle 18 causing it to expand the gap X will be diminished as hoops 68 and 69 yield to permit positioning lugs 60 and 62 to project deeper into recesses 52 and 54. The dimensions of recesses 50 and 54 are contoured to a depth sufficient to receive the respective lugs under maximum predetermined temperature expansion conditions. As a result of this mode of mounting any compression or tension load induced in boss 50 will not be borne by nozzle 18 and vice versa. Thus the free floating movement of lugs 60 and 62 into their respective recesses avoids enormous and potentially destructive stress buildups and insures the integrity of individual nozzles 18. A noninterrupted flow of hot gases from chamber 32 to buckets 19 is thus achieved.

Another feature of the instant invention concerns preventing ring 12 from rotating relative to manifold 30. Referring to FIGS. 1, 2, and 3, and especially FIG. 2, the majority of the ribs 40 have a portion of their forward or downstream sections removed so as to constitute locking tongues 42. In a similar manner a section is removed from the inner or upstream wall of the majority of vanes 14 to constitute locking tongues 46. Rib locking tongues 42 and vane locking tongues 46 are designed to mate with one another in close interfitting relationship. The reaction to impingement of hot fluid upon buckets 19 tends to produce a counter-rotation of nozzle ring 12; in this case, in a clockwise direction. However, rib locking tongues 42 serve as stops to prevent the counter-rotation. It should be noted that counter-rotation would produce misalignment between windows 33 and nozzles 18 causing a disrupted, unpredictable flow. When the turbine is idle there is the possibility of misaligning windows 33 and nozzles 18 by some external force. For example, although an external force could not rotate ring 12 in a clockwise direction, because rib locking tongues 42 would stop such rotation, an external force could possibly rotate ring 12 in a counterclockwise direction. To guard against this occurrence one or more ribs such as 44, shown in FIG. 2, is provided with an eccentric locking tongue 45; that is tongue 45 is formed on the side opposite the side on which locking tongues 42 are formed. An eccentric vane locking tongue 47 is formed on vane 15 in order to mate with eccentric locking tongue 45. Thus, hot fluid reaction forces are prevented from rotating ring nozzle 12 in a clockwise direction by tongues 42 and unforeseeable external forces are prevented from rotating ring nozzle 12 in a counterclockwise direction because of locking tongue 45. Three or more eccentric tongues 45 provide automatic centering of ring 12.

As shown in FIG. 3, rearward wall 48 of vane locking tongue 46 is separated by a slight gap Y from adjacent wall portion 49 to rib 42. The dimensions of locking tongues 46 and 42 are designed such that gap Y will allow maximum predetermined thermal expansion of the adjacent parts. It can now be seen that nozzle ring 12 can freely thermally expand radially through gap X as well as axially through gap Y while at the same time being maintained in a fixed position relative to manifold 30. Nozzle ring 12 is therefore capable of the necessary movement radially and axially for relief from excessive and potentially destructive loads but remains locked from rotation in both directions.

In order to assemble stator 10, ring 12 and retaining rings 61 and 63 are first welded to leaf spring hoops 68 and 69. Then as a unit these components are inserted into the cavity provided in boss 50. Ring 12 is accurately positioned with the locking tongues in predetermined mated relationship. Then retaining rings 61 and 63 are welded by an electron beam welding device or the like at zones 64 and 66 to boss 50. The only connection between ring 12 and retaining rings 61 and 63 is through hoops 68 and 69 which serve as resilient interconnecting elements. Ring 12 is mounted for free movement relative to retaining rings 61 and 63 as well as to the other components of stator 10. It can now be seen that because ring nozzle 12 is relieved from bearing the loads that conventional hot fluid nozzle rings are subjected to, it can easily withstand greater temperatures and pressures and still retain its integrity.

Since it is obvious that many changes and modifications can be made in the above-described details without departing from the nature and spirit of the invention, it is to be understood that the invention is not to be limited thereto except as set forth in the appended claims.

I claim:

1. In a fluid discharge device having a stator formed therein with a fluid collecting chamber and an annular fluid discharge port, and a nozzle ring characterized by a pair of concentric rings having a system of vanes therebetween, the improvement comprising:
   oppositely facing annular recesses in the walls defining the annular port,
   a pair of radially extending lugs on the nozzle ring positioned in the recesses, the lugs and recess walls constituting a thermal expansion coupling,
   a series of spaced ribs fixed between the port walls,
   means for locking the stator and ring from relative rotation to maintain adjacent ends of the ribs and vanes in fixed co-alignment,
   and means for resiliently interconnecting the nozzle ring to the stator so that the concentric rings of the nozzle ring are prevented from bearing against the adjacent port walls and the lugs are maintained spaced from the recess walls during temperature changes.

2. The structure according to claim 1 wherein the locking means comprises:
   interlocking tongues formed on the adjacent ends of the vanes and ribs to stop rotation between the stator and ring in reaction to fluid flow wherein at least one of the ribs is formed with an eccentric locking tongue and the adjacent vane is formed with a mating eccentric tongue.

3. The structure according to claim 1 wherein the adjacent rib and vane ends are sufficiently spaced to allow free thermal expansion of the nozzle ring in the axial direction.

4. The structure according to claim 1 wherein the resilient means is a pair of concentric leaf-spring hoops secured at their opposing ends to portions of the body defining the annular recesses and to the lugs.

5. The structure according to claim 1 wherein the ribs and vanes are held in co-alignment by a pair of retaining rings connected to the stator.

References Cited

UNITED STATES PATENTS

| 1,154,777 | 9/1915 | Kieser | 253—78 |
| 2,702,688 | 2/1955 | Ericson | 253—78 |
| 2,849,209 | 8/1958 | Burgess et al. | 253—78 |

FOREIGN PATENTS

| 227,457 | 3/1925 | Great Britain. |

EVERETTE A. POWELL, JR., *Primary Examiner.*